United States Patent
Braudaway et al.

(10) Patent No.: US 6,915,432 B1
(45) Date of Patent: *Jul. 5, 2005

(54) COMPOSING A REALIGNED IMAGE

(75) Inventors: Gordon Wesley Braudaway, Yorktown Heights, NY (US); Frederick Cole Mintzer, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/351,199

(22) Filed: Jul. 9, 1999

Related U.S. Application Data

(60) Provisional application No. 60/117,866, filed on Jan. 29, 1999.

(51) Int. Cl.[7] .............................. H04K 9/00; H04K 1/00; H04N 7/167
(52) U.S. Cl. ...................... 713/176; 713/168; 713/182; 380/203
(58) Field of Search ................................ 713/176, 168, 713/182; 380/203, 201; 382/123

(56) References Cited

U.S. PATENT DOCUMENTS

| 5,251,271 A | 10/1993 | Fling ........................... 382/44 |
| 6,344,698 B2 * | 2/2002 | Barr et al. .................... 251/797 |
| 6,453,069 B1 * | 9/2002 | Matsugu et al. ............ 382/173 |
| 6,456,340 B1 * | 9/2002 | Margulis ..................... 348/745 |
| 6,512,857 B1 * | 1/2003 | Hsu et al. .................... 382/294 |
| 6,571,021 B1 * | 5/2003 | Braudaway ................. 382/275 |
| 2003/0058472 A1 * | 3/2003 | Davies et al. ............... 358/1.18 |
| 2003/0128861 A1 * | 7/2003 | Rhoads ........................ 382/100 |

* cited by examiner

*Primary Examiner*—Norman M. Wright
(74) *Attorney, Agent, or Firm*—Louis P. Herzberg

(57) ABSTRACT

This invention provides methods, apparatus and article of manufacture used as a countermeasure to image distorting. The present invention involves automatically detecting the presence of distortion in a presumed distorted image, measuring the magnitude and type of distortion, and finally creating a realigned image. Once image distortion is removed, conventional invisible watermark extraction methods are employed to extract the watermark from the realigned image. The automatic method does not depend on a process of visually examining a composite image and recording the coordinates of pixel locations closest to common image features in a distorted image and reference image. Generally, the presumed distorted image is resized to the same size as the reference image. Reference centers at at least three distinct points that do not form a straight line are selected. At each reference center, a sub-image is excised. Pairs of sub-images, one excised from the reference image and the other excised from the distorted image, having the same reference center are used in the process of removal of the distortion.

29 Claims, 2 Drawing Sheets

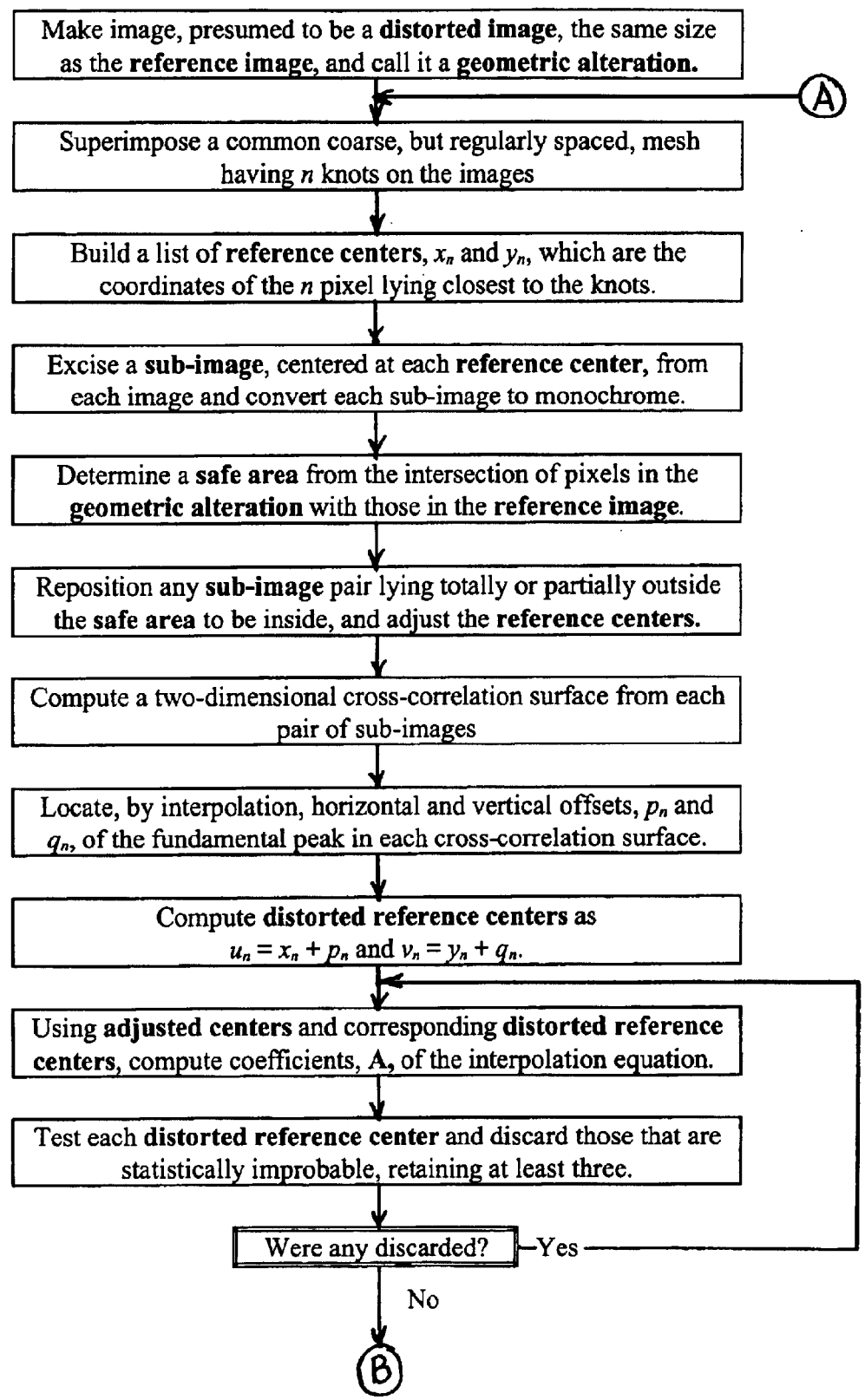
FIGURE

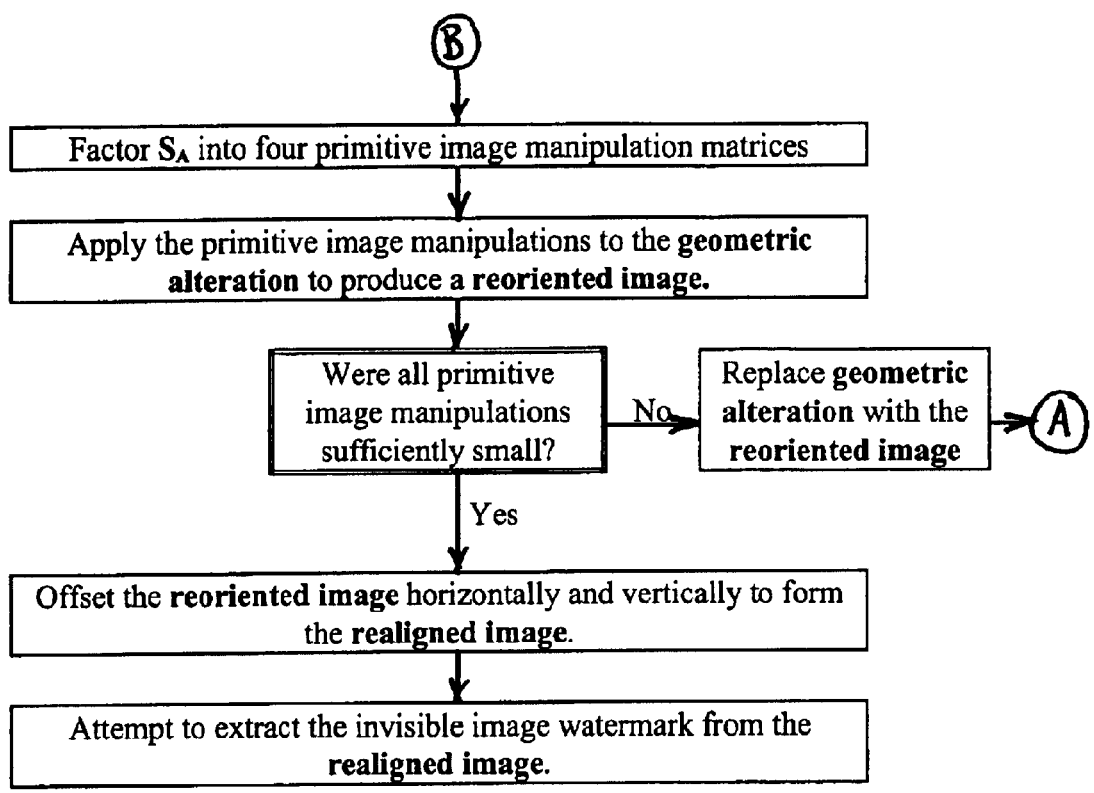
FIGURE (cont.)

US 6,915,432 B1

COMPOSING A REALIGNED IMAGE

PRIORITY

The present application claims priority of Provisional Application, Application No. 60/117,866, having the same title and a filing date of Jan. 29, 1999, by inventors Gordon Braudaway et al.

CROSS REFERENCES

The present application is related to the following applications even dated with non-provisional application Ser. No. 09/242,212, entitled, "Recovering Invisible Digital Image Watermarks From Distorted Images," by inventors Gordon Braudaway et al.; and application Ser. No. 60/117,921 entitled, "Watermarking and Determining Distortion in an Image," by inventors Gordon Braudaway et al., which are incorporated herein by reference in their entirety, for all purposes.

FIELD OF THE INVENTION

This application relates to the field of digitized imaging. It is more specifically directed to determining and removal of image distortion from an image.

BACKGROUND OF THE INVENTION

With the development of means of production and circulation of digital images, and the means of imbedding relatively invisible watermarks into digital images ostensibly to convey ownership of the image, there is now financial incentive to attack an imbedded watermark in an attempt to render it non-extractable. Pixel locations of a watermarked image are presumed to correspond to those in an unmarked original image. Generally, the watermark is imbedded by altering only the values of the pixel components of the original image, not their geometric positions. This may be accomplished employing such methods as described in U.S. Pat. No. 5,825,892 which is incorporated herein by reference in its entirety.

Some methods of attacking an imbedded watermark rely on constructing a new image that is a geometrically distorted copy of the watermarked image. This new image is herein referred to as a distorted copy. Pixels in the distorted copy are placed at subtly distorted positions relative to those in the watermarked image. Pixel component values in the distorted copy are determined by two-dimensional interpolation of component values of enclosing pixel in the watermarked image. No constraints can be placed on the types of pixel position distortion an attacker might choose to use. To those skilled in the art, however, it is obvious that excessive pixel position-distortion will cause the distorted copy to be a caricature of the watermarked image, thus diminishing or destroying its economic value. Whether a distortion is excessive is a subjective measure. For a distorted copy to be useful, it requires that linear or nonlinear distortion methods that are used by an attacker have to be used sparingly and in such a manner as to produce smoothly varying and relatively small position distortions. This is so as to be essentially unobjectionable and casually unnoticeable to untrained observers. The human visual system, as a qualitative measuring device, can be relied upon to readily detect excessive distortion. It is desirable to have a method of defense that requires little or no limits to be placed on pixel position-distortions produced by the attacking method.

SUMMARY OF THE INVENTION

In one aspect, the present invention provides a method, apparatus and article of manufacture employing an undistorted reference image relative to which measurements of distortion are made. These employ an automatic method for composing a realigned image which does not depend on a process of visually examining a composite image, and recording the coordinates of pixel locations closest to common image features in a distorted image and reference image. If the presumed distorted image is not the same size as the reference image, it is made so by shrinking or enlarging the reference image. At the next step, at least three distinct points that do not form a straight line are selected. The integer coordinates of the pixels nearest these points are herein referred to as reference centers. At each reference center, a segment of each image, herein referred to as a sub-image, is excised, thus producing for each image as many sub-images as there are distinct points. The horizontal and vertical dimensions of the sub-images, in integer pixel coordinates, are respectively based on the common horizontal and vertical dimensions of the images. A pair of sub-image, one excised from the reference image and the other excised from the distorted image, having the same reference center are manipulated to determine and/or substantially remove the distortion from the distorted image.

Another aspect of the present invention enables a digital image watermark to be extracted from a geometrically distorted copy of a reference image.

Other aspects and a better understanding of the invention may be realized by referring to the Detailed Description.

BRIEF DESCRIPTION OF THE DRAWING

These and other objects, features, and advantages of the present invention will become apparent upon further consideration of the following detailed description of the invention when read in conjunction with the drawing FIGURE.

DESCRIPTION OF THE INVENTION

The present invention provides a method, apparatus and article of manufacture by which the distortion in a distorted copy of an image is automatically measured and removed sufficiently well that a relatively is invisible image watermark extraction is possible. In an embodiment of the invention, the method employs a reference image relative to which measurements of distortion are made. For example, an original unmarked image or a relatively invisibly watermarked copy of the original image, called a watermarked image, serve equally well as the reference image.

The automatic method composes a realigned image in a way that does not depend on a process of visually examining a composite image and recording the coordinates of pixel locations closest to common image features in a distorted copy and reference image, as is the case in the semiautomatic method of application Ser. No. 09/240,242, cross-referenced herewith.

As with the semiautomatic method, if the presumed distorted copy is not the same size as the reference image, it is made so by shrinking or enlarging the distorted copy using a method such as pixel interpolation or pixel extrapolation. The distorted copy, after being geometrically resized, is herein referred to as a geometric alteration. There are well known automatic and manual methods for resizing images.

At the next step, the automatic process differs from the semiautomatic process. At least three common pixel locations in the two images, herein referred to as reference centers, not lying in any straight line are required for the automatic method of this invention. In an example embodiment, a coarse but regularly spaced simulated mesh is superimposed identically on each of the two images. Each knot in the mesh forms one of the common pixel locations. The integer coordinates of the pixels nearest each of the at least three common pixel locations are the reference centers. At each reference center, a segment of each image, herein referred to as a sub-image, is excised, thus producing for each image as many sub-images as there are common pixel locations. The horizontal and vertical dimensions of the sub-images, in integer pixel coordinates, are based on the common horizontal and vertical dimensions, respectively, of the images. The pair of sub-images, one excised from the reference image and the other excised from the geometric alteration, having the same reference center are herein referred to as corresponding sub-images. A typical embodiment employs three common pixel locations.

When the geometric alteration is laid upon the reference image, the intersection of pixels in the reference image with pixels in the geometric alteration is an area of each image called the safe area. Although initially the safe area is the entire area of the geometric alteration and the reference image, on subsequent iterations of this realignment method the safe area may be smaller than the reference image. Each sub-image is centered at its respective reference center. If any pixel off a sub-image extends beyond the boundaries of the safe area, such as at the edges of the safe area, then the top or bottom edge of the corresponding sub-images, and the left or right edge of the corresponding sub-images, if also necessary, are repositioned. The two subimages, in unison, are repositioned vertically and horizontally by the minimum number of pixel locations necessary so that no pixel of either sub-image lies in whole or in part outside of the safe area. The corresponding reference center is adjusted to lie at the center of the repositioned sub-images. Reference centers, after this adjustment process, are referred to as adjusted centers, whether they were adjusted or not. Note that in the case where the sub-image horizontal width, I, and vertical height, J, are even integers, such as powers of two, and the coordinates of the sub-images are indexed 0 to I−1 and 0 to J−1, respectively, the integer coordinates of the center of each sub-image are defined to be I/2 and J/2. Also note that I should be less than the width and J should be less than the height of the reference image and the geometric alteration.

The n-th pair of sub-images, one from the reference image designated the n-th reference sub-image and a corresponding one from the geometric alteration designated the n-th distorted sub-image, is used to compute a two-dimensional cross-correlation surface relating the distorted sub-image with the reference sub-image image. Those skilled in the art will recognize that there are many methods that may be used to compute or approximate a cross-correlation surface relating the two corresponding sub-images. Regardless of the method used, any method that produces the intended result of determining the horizontal and vertical offsets of the distorted sub-image relative to the reference sub-image that achieves a good match may be employed. For example, a good match has offsets that can not be improved by more than the spacing of 1.5 pixels in any direction by using any other means of pattern matching. A better match is readily achievable if the distortions are generally linear. Watermark detection seldom requires a match better than a 0.5–2.0 pixel spacing. If required, more complex iteration techniques may be used to achieve a best match.

In an example embodiment, forward and inverse discrete Fast Fourier Transforms (FFT's) are used to compute a cross-correlation surface. Note that for methods using FFT's, all sub-images are converted to monochrome, if not already so. The non-integer interpolated horizontal and vertical offsets of the peak of the cross-correlation surface, $p_n$ and $q_n$, relative to the origin of the cross-correlation surface are used as additive offsets relating the center of the n-th distorted sub-image relative to the n-th corresponding adjusted center. Thus, for each pair of sub-images, the coordinates of the adjusted center are the center on the n-th reference sub-image. The sums of the coordinates of the adjusted center plus the offsets of the peak of the n-th cross-correlation surface become the approximate coordinates of the center of the distorted sub image, $u_n = x_n + p_n$ and $v_n = y_n + g_n$. The coordinates of the offset center of the distorted sub-sub image and the adjusted center, herein referred to as computed pixel coordinates, are analogous to the measured pixel coordinates of common features visually selected from the geometric alteration and reference image of the previously cited semiautomatic method. Using the computed pixel coordinates instead of the measured pixel coordinates, the coefficients matrix, A, of the pixel position interpolation equations are computed, as in the semiautomatic method.

In another example embodiment, forward and inverse discrete Fast Fourier Transforms (FFT's) are used to compute a modified cross-correlation surface. The magnitudes of the Fourier transform coefficients are modified to make said magnitudes uniform. An inverse Fourier transform is used to compute the modified cross-correlation surface.

In yet another example embodiment, a weighted sum of the ordinary and modified Fourier transform coefficients is formed before using an inverse Fourier transform to compute a weighted cross correlation surface.

In an embodiment of the automatic method, use of a statistical screen is incorporated into the next step. Use of a statistical screen is generally not needed in the semiautomatic method. Because the selection of sub-images is done indiscriminately, it is possible that some sub-images may have few features (or even none). The cross-correlation surfaces computed from such sub-images may be relatively flat and have a misleading peak. An additional test is used to discriminate against statistical out-flyers that can occur from such misleading peaks. As used herein, an 'out-flyer' is a value from a set of values that deviates so greatly from the other values in the set that it is statistically unlikely to be a member of the set.

An example statistical screen discriminating against out-flyers is embodied as follows. Each of the pairs of computed pixel coordinates, $u_n$ and $v_n$, is processed by the interpolation equations to give a proposed reference center, $x_n'$ and $y_n'$. The Euclidean distance between the proposed reference center and the corresponding adjusted center, $x_n$ and $y_n$, is computed for each of the n sub-images. Out-flyers are deleted from the set of n Euclidean distances, largest first, based on their value being above a first threshold value. If any out-flyer is deleted, the offset center of its corresponding distorted sub-image and adjusted center are also deleted. The coefficients, A, are recomputed using the undeleted pairs of pixel coordinated, but never with fewer than three pairs of pixel coordinates.

From this point on, the automatic and semiautomatic methods generally parallel one another. The square submatrix, $S_A$, of four of the coefficients of the interpolation equations is factored into four primitive image manipulation matrices. The geometric alteration is manipulated by the four primitive image manipulations to form the reoriented image.

The entire restoration process is advantageously repeated iteratively by substituting the previously reoriented image for the geometric alteration before each subsequent iteration. For the automatic method, it has been found that for images with significant distortion, as many as three iterations are warranted. For attacks with more nonlinear distortion, additional iterations may be used to further improve reorientation of the geometric alteration. The iteration process is terminated when examination of the Euclidean distances shows that the reduction of all Euclidean distances relative to those from the previous iteration is less than a second threshold. Finally, the reoriented image is realigned left or right and up or down relative to the reference image, based on the offset coefficients c and f from the interpolation equations, to form the realigned image.

An overview of the steps of an example automatic realignment of a presumed distorted copy is shown in the figure. First, if the presumed distorted copy is not the same size as the reference image, it is shrunk or enlarged to make it the same size using any image resizing method; the resized distorted copy is herein referred to as the geometric alteration, (102).

In a particular embodiment, a common coarse but regularly spaced mesh having n knots is superimposed on both of the images, (104). The knots of the mesh serve as reference points for each of the images. A list of the horizontal and vertical coordinates, $x_n$ and $y_n$, of pixels lying closest to the knots of the mesh is built; these coordinate pairs are herein referred to as the reference centers, (106). A sub-image, having dimensions I and J and centered at each of the reference centers, is excised from each of the images and converted to monochrome, if not already so, (108), producing n corresponding pairs of sub images. A safe area is determined as the intersection of pixels common to the geometric alteration and reference image (110). If any part of any sub-image lies beyond the boundaries of the safe area, it is repositioned left or right and up or down a minimum number of pixel locations until both it and its corresponding sub-image lie within the boundaries of the safe area, and their common reference center is adjusted to again lie at the center of the repositioned sub-images, (112). A two-dimensional cross correlation surface is computed from each of the n pairs of sub-images, (114). The non-integer horizontal and vertical coordinate offsets, $p_n$ and $q_n$, of the greatest peak on each of the n cross-correlation surfaces are determined by two-dimensional interpolation, (116). The distorted reference centers are computed by adding the coordinate offsets to their corresponding adjusted centers, (118). Using the adjusted centers and the distorted reference centers in stead of the manually measured pixel coordinate pairs, as in the referenced semiautomatic method, the coefficients matrix, A, of the pixel position interpolation equations is computed, (120), in a manner identical to that used in the cross-referenced semiautomatic method.

In this embodiment, the automatic method differs from the cross-referenced semiautomatic method in at least the next steps. Using the pixel position interpolation equations, each of the distorted reference centers is converted to form a proposed reference center. The Euclidean distance between each of the proposed reference center and its corresponding adjusted center is computed. Those that are "out-flyers", for example those greater than a first threshold, say a spacing of 5 pixels, are discarded while at least three are always retained, (122). If any of the distorted reference centers is discarded, (124), steps (120) through (124) are repeated using only the not-discarded adjusted centers and the not-discarded distorted reference centers. Otherwise, as in the referenced semiautomatic method, the square submatrix, $S_A$, of four of the coefficients is factored into four primitive image manipulating matrices, (126), and the geometric alteration is manipulated by the four primitive image manipulations to form the reoriented image, (128).

If any of the primitive manipulations is not sufficiently small, as determined by comparing the incremental changes of the not-discarded Euclidean distances to a second threshold, (130), the geometric alteration is replaced by the reoriented image, (132), and steps (104) through (130) are repeated. Otherwise, the reoriented image is offset according to the computed horizontal and vertical offset values to form the realigned image, (134). Often, an attempt is made to extract the invisible watermark from the realigned image, (136).

It is noted that the foregoing has outlined some of the more pertinent objects and embodiments of the present invention. This invention may be used for many image or image-like applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for restoring a geometrically distorted copy of a reference image, said method comprising:
   automatically determining a type and amount of distortion of said distorted copy, without extracting a registration signal;
   substantially reversing the distortion to form a reoriented image;
   horizontally and vertically aligning the reoriented image with the reference image to form a realigned image; and
   extracting a watermark from the realigned image.

2. A method as recited in claim 1, wherein the step of composing includes:
   shrinking or enlarging the distorted copy vertically by pixel interpolation or extrapolation such that the produced geometric alteration has a same height as the reference image, and
   shrinking or enlarging the produced geometric alteration horizontally by pixel interpolation or extrapolation to have the same width as the reference image.

3. A method, as recited in claim 1, wherein the reference image is an original unmarked image.

4. A method for restoring a geometrically distorted copy of a reference image, said method comprising:
   automatically determining a type and amount of distortion of said distorted copy; and
   substantially reversing the distortion to form a reoriented image;
   wherein the step of automatically determining includes:
      composing a geometric alteration of the distorted copy by making the distorted copy the same size as the reference image;
      defining a safe area having safe pixels, wherein said safe area is an intersection of pixels in the reference image with pixels in the geometric alteration, and said safe pixels includes any pixel from the reference image or the geometric alteration which lies in the safe area;

selecting 'n' points in the safe area, wherein 'n' is at least three and not all 'n' points lie on a straight line;

building a list of 'n' reference centers, wherein each reference center corresponds to coordinates of a particular pixel lying closest to a particular one of said 'n' points;

constituting a plurality of pairs of sub-images, wherein each pair is centered at one of said reference centers and each pair is formed by a sub-image from the geometric alteration and a corresponding sub-image from the reference image;

minimally horizontally and vertically positioning from an original sub-image position to a new sub-image position any sub-image pair having any sub-image pixel lying outside the safe area, such that said any sub-image pixel lies within the safe area;

adjusting the reference center of said any sub-image pair to correspond to said new sub-image position;

computing a two-dimensional cross correlation surface from each of the 'n' pairs; locating a horizontal, $p_n$, and a vertical, $q_n$, coordinate offset of the greatest peak on each cross-correlation surface;

calculating a plurality of distorted centers;

using the adjusted centers and the corresponding distorted centers to compute the coefficients matrix, A, of a pixel position interpolation equation; and forming a sub-matrix, $S_A$, from the first, second, fourth and fifth elements of the matrix A.

5. A method as recited in claim 4, further comprising:

computing a set of proposed reference centers based on the distorted reference centers and the pixel position interpolation equations;

computing the Euclidean distances between the proposed reference centers and the adjusted centers;

testing each Euclidean distances to determine if said each Euclidean distance is statistically improbable;

discarding said each distorted center and its corresponding adjusted center that define a Euclidean distance that is statistically improbable while retaining at least three not-discarded distorted centers and their corresponding adjusted centers; and recomputing the coefficients matrix, A, of a pixel position interpolation equation using the at least three not-discarded distorted centers and corresponding adjusted centers.

6. A method as recited in claim 4, wherein the steps of substantially reversing includes:

factoring the sub-matrix $S_A$ into four primitive image manipulation matrices;

applying the four primitive image manipulation matrices to the geometric alteration to produce a reoriented image;

making the geometric alteration identical to the reoriented image if any primitive image manipulation matrix produces a distortion greater than a predetermined threshold, said distortion determined by examining all iteration-to-iteration incremental changes in the Euclidean distances; and repeating all the steps of claim 4 except the step of composing, all the steps of claim 5, and the steps of factoring, applying and making until no primitive image manipulation matrix produces a distortion greater than the predetermined threshold.

7. A method, as recited in claim 4, wherein the step of horizontally and vertically aligning includes translating horizontally the reoriented image by the value of the third coefficient of the matrix, A, and translating vertically the reoriented image by the value of the sixth coefficient of the matrix, A, to form the realigned image.

8. A method as recited in claim 4, wherein the coordinate offsets are non-integers and the step of locating includes using interpolation.

9. A method as recited in claim 4, wherein the step of computing includes:

comparing a region in the geometric alteration surrounding each of said reference centers with regions in the reference image shifted in position by a multiplicity of coordinate offsets;

ascertaining horizontal and vertical coordinate offsets of each selected reference center as being the horizontal and vertical offset at which the region in the geometric alteration and the region on the reference image most nearly match; and calculating the distorted centers from the coordinate offsets and the corresponding reference centers.

10. A method as recited in claim 9, wherein the step of comparing includes:

using a modified cross correlation function in which the Fourier transform of the cross correlation function is computed, wherein magnitudes of the Fourier transform coefficients are modified to make said magnitudes uniform, and using an inverse Fourier transform to compute the modified correlation function.

11. A method as recited in claim 9, wherein the step of comparing includes:

using a weighted cross correlation function in which the Fourier transform of the cross correlation function is computed, wherein a weighted sum of the ordinary and modified Fourier transform coefficients is formed, and using an inverse Fourier transform to compute the weighted correlation function.

12. A method as recited in claim 4, wherein the step of selecting 'n' points includes employing a simulated mesh with knots.

13. A method for restoring a geometrically distorted copy of a reference image, said method comprising:

automatically determining a type and amount of distortion of said distorted copy; and substantially reversing the distortion to form a reoriented image, wherein the step of composing includes:

shrinking or enlarging the distorted copy vertically by pixel interpolation or extrapolation such that the produced geometric alteration has a same height as the reference image, and shrinking or enlarging the produced geometric alteration horizontally by pixel interpolation or extrapolation to have the same width as the reference image; and wherein the step of ascertaining includes:

composing a geometric alteration of the distorted copy by making the distorted copy the same size as the reference image;

defining a safe area having safe pixels, wherein said safe area is an intersection of pixels in the reference image with pixels in the geometric alteration, and said safe pixels includes any pixel from the reference image or the geometric alteration which lies in the safe area;

building a list of reference centers, wherein each reference center corresponds to coordinates of a particular pixel in the safe area lying closest to a particular one of said at least three pixel locations;

computing a plurality of corresponding distorted centers;

using the reference centers and the corresponding distorted centers to compute coefficients of a matrix, A, of pixel position interpolation equations;

testing each distorted center to determine if said each distorted center is statistically improbable; and discarding each distorted center that is statistically improbable while retaining at least three not-discarded distorted centers, until no more distorted centers are discarded.

14. An article of manufacture comprising a computer usable medium having computer readable program code means embodied therein for causing a restoring of a geometrically distorted copy of a reference image, the computer readable program code means in said article of manufacture comprising computer readable program code means for causing a computer to effect:

automatically determining a type and amount of distortion of said distorted copy, without extracting a registration signal;

substantially reversing the distortion to form a reoriented image;

aligning the reoriented image with the reference image to form a realigned image; and extracting a watermark from the realigned image.

15. An article of manufacture as recited in claim 14, wherein the reference image is a copy of an original unmarked image.

16. An article of manufacture as recited in claim 14, wherein the step of automatically determining includes:

selecting a set of at least three reference centers in the geometric alteration;

comparing a region in the geometric alteration surrounding each of said reference centers, with regions in the reference image shifted in position by a multiplicity of coordinate offsets;

ascertaining horizontal and vertical coordinate offsets of each selected reference centers as being the horizontal and vertical offset at which the region in the geometric alteration and the region on the reference image most nearly match; and determining the type and amount of distortion from the coordinate offsets and the set of reference centers.

17. An article of manufacture as recited in claim 16, wherein the step of comparing includes:

using a modified correlation function in which the Fourier transform of the correlation function is computed, wherein the magnitudes of the Fourier transform coefficients are modified to make said magnitudes uniform, and using an inverse Fourier transform to compute the modified correlation function.

18. An article of manufacture as recited in claim 16, wherein the step of ascertaining includes performing a least-squares fit on the horizontal and vertical coordinate offsets of the set of reference centers.

19. A computer program product comprising a computer usable medium having computer readable program code means embodied therein for causing a readjusting of a geometrically distorted copy of a reference image, the computer readable program code means in said computer program product comprising computer readable program code means for causing a computer to effect:

automatically determining a type and amount of distortion of said distorted copy, without extracting a registration signal;

substantially reversing the distortion to form a reoriented image;

horizontally and vertically aligning the reoriented image with the reference image to form a realigned image; and extracting a watermark from the realigned image.

20. An apparatus for restoring a geometrically distorted copy of a reference image, said method comprising:

means for automatically determining a type and amount of distortion of said distorted copy, without extracting a registration signal;

means for substantially reversing the distortion to form a reoriented image;

means for horizontally and vertically aligning the reoriented image with the reference image to form a realigned image, and means for extracting a watermark from the realigned image.

21. An apparatus for restoring a geometrically distorted copy of a reference image, said method comprising:

means for automatically determining a type and amount of distortion of said distorted copy, and means for substantially reversing the distortion to form a reoriented image;

wherein the means for automatically determining includes:

means for composing a geometric alteration of the distorted copy by making the distorted copy the same size as the reference image;

means for defining a safe area having safe pixels, wherein said safe area is an intersection of pixels in the reference image with pixels in the geometric alteration, and said safe pixels includes any pixel from the reference image or the geometric alteration which lies in the safe area;

means for selecting 'n' points in the safe area, wherein 'n' is at least three and not all 'n' points lie on a straight line;

means for building a list of 'n' reference centers, wherein each reference center corresponds to coordinates of a particular pixel lying closest to a particular one of said 'n' points;

means for constituting a plurality of pairs of sub-images, wherein each pair is centered at one of said reference centers and each pair is formed by a sub-image from the geometric alteration and a corresponding sub-image from the reference image;

means for minimally horizontally and vertically positioning from an original sub-image position to a new sub-image position any sub-image pair having any sub-image pixel lying outside the safe area, such that said any sub-image pixel lies within the safe area;

means for adjusting the reference center of said any sub-image pair to correspond to said new sub-image position;

means for computing a two-dimensional cross correlation surface from each of the 'n' pairs;

means for locating a horizontal, $p_n$, and a vertical, $q_n$, coordinate offset of the greatest peak on each cross-correlation surface;

means for calculating a plurality of distorted centers;

means for using the adjusted centers and the corresponding distorted centers to compute the coefficients matrix, A, of a pixel position interpolation equation; and means for forming a sub-matrix, $S_A$, from the first, second, fourth and fifth elements of the matrix A.

22. An apparatus as recited in claim 21, further comprising:

means for computing a set of proposed reference centers based on the distorted reference centers and the pixel position interpolation equations;

means for computing the Euclidean distances between the proposed reference centers and the adjusted centers;

means for testing each Euclidean distances to determine if said each Euclidean distance is statistically improbable;

means for discarding said each distorted center and its corresponding adjusted center that define a Euclidean distance that is statistically improbable while retaining at least three not-discarded distorted centers and their corresponding adjusted centers; and means for recomputing the coefficients matrix, A, of a pixel, position interpolation equation using the at least three not-discarded distorted centers and corresponding adjusted centers.

23. An apparatus as recited in claim 21, wherein the coordinate offsets are non-integers, and the means for locating includes using interpolation.

24. A method for restoring a geometrically distorted copy of a reference image, said method comprising:

automatically determining a type and amount of distortion of said distorted copy; and substantially reversing the distortion to form a reoriented image;

wherein the steps of automatically determining and substantially reversing are repeatedly applied until an amount of the distortion falls below a given threshold.

25. A method as recited in claim 24, wherein the given threshold is less than a 0.5 pixel spacing.

26. A method comprising:

automatically measuring the degree of distortion imparted upon a distorted replica of an original image, without extracting a registration signal;

substantially reversing the degree of distortion of the distorted replica to form an undistorted image; and aligning the undistorted image with the original image; and extracting a watermark from the realigned image.

27. A method as recited in claim 26, further comprising determining whether the distorted replica image has been geometrically distorted relative to another form of the original image.

28. An article of manufacture comprising a computer usable medium having computer readable program code means embodied therein for causing watermark extraction from an image, the computer readable program code means in said article of manufacture comprising computer readable program code means for causing a computer to effect:

automatically measuring the degree of distortion imparted upon a distorted replica of an original image, without extracting a registration signal;

substantially reversing the degree of distortion of the distorted replica to form an undistorted image; and aligning the undistorted image with the original image; and extracting a watermark from the realigned image.

29. An article of manufacture as recited in claim 28, the computer readable program code means in said article of manufacture further comprising computer readable program code means for causing a computer to effect determining whether the distorted replica image has been geometrically distorted relative to another form of the original image.

* * * * *